GATED DIODE SELECTION DRIVE SYSTEM

Filed May 25, 1961 2 Sheets-Sheet 1

X-Y DRIVE

R/W DRIVER CONNECTION TO GATE

INVENTOR.
R. J. FLAHERTY

BY

Sughrue, Rothwell, Mion & Zinn
ATTORNEYS

June 29, 1965 R. J. FLAHERTY 3,192,510

GATED DIODE SELECTION DRIVE SYSTEM

Filed May 25, 1961 2 Sheets-Sheet 2

X OR Y DRIVE

United States Patent Office 3,192,510
Patented June 29, 1965

3,192,510
GATED DIODE SELECTION DRIVE SYSTEM

Robert J. Flaherty, Pleasant Valley, N.Y., assignor to International Business Machines Corporation, New York, N.Y., a corporation of New York Filed May 25, 1961, Ser. No. 112,551
5 Claims. (Cl. 340—174)

This invention relates to a drive system for a magnetic core array and more particularly to such a system employing a current steering technique whereby coincident activation of one write or read driver and one gate for each address dimension selects a unique drive line to thereby address the magnetic core array.

One of the most widely employed memories used in digital computers is a magnetic core array. The array is essentially comprised of a plurality of magnetic cores exhibiting a rectangular hysteresis loop characteristic. These cores are arranged in rows and columns and drive means are associated therewith to address one or a plurality of the cores in the array. It is also conventional to arrange these cores in a two-dimensional form or a three-dimensional form. The present invention has application to both.

Generally speaking in accordance with the present invention, there is provided a drive means for each of the necessary coordinates of the array which drive means provides sufficient read or write current to perform these respective functions. The drive lines associated with all of the cores carry this necessary current thereto. Associated with one end of each drive line is a gating circuit. This gating circuit functions effectively as a switch having an open and closed condition. With the other end of each of the drive lines is associated a read driver and a write driver. One particular feature of this invention is that all of the drivers and the gates include a transistor of one conductivity type. Oppositely poled diodes are associated with the driver end of each of the drive lines, one of the diodes being associated with the read driver and one with the write driver. By proper opening and closing of these read and write drivers, together with the opening and closing of the associated gate, read and write current is respectively provided. By this proper manipulation, a current steering technique is provided which is unique to this invention.

It is therefore one object of this invention to provide a novel drive arrangement for addressing cores in a core memory array.

A more specific object is to provide such a drive system in which only one conductivity type transistor is employed.

It is a further object of the present invention to provide such a drive system in which bi-polar operation, that is, provision of read and write current flowing in opposite directions through a drive line and with its associated cores is achieved in a system employing only a single conductivity type transistor.

These and other objects are achieved in accordance with the present invention by providing a magnetic core array including a plurality of drive lines threading a plurality of said cores in which the drive system comprises first, second and third switch means associated with each of the drive lines, each of said switch means having an open and closed condition and including a terminal thereof which is at a first potential when said switch means is in a closed condition and at a second potential when said switch means is in an open condition, a source of current and an impedance associated with each of said switches to establish said first and second potentials, means connecting one end of each of said drive lines to the terminal of its associated first switch means, a first diode poled in a first direction and connected between the other end of each of the drive lines and said terminal of said second switch means associated with each drive line, a second diode poled in the second direction and connected between said other end of each of said drive lines and said terminal of said third switch means associated with each drive line, whereby simultaneous opening of said second and third switch means and closing of said first switch means drives current through said drive lines in a first direction and opening said first and second switch means and closing said third switch means drives current through said drive lines in a second direction.

Other objects and advantages of the invention will be pointed out in the following description and claims and illustrated in the accompanying drawings, which disclose, by way of example, the principles of the invention and the best mode which has been contemplated of applying those principles.

Figure 1:
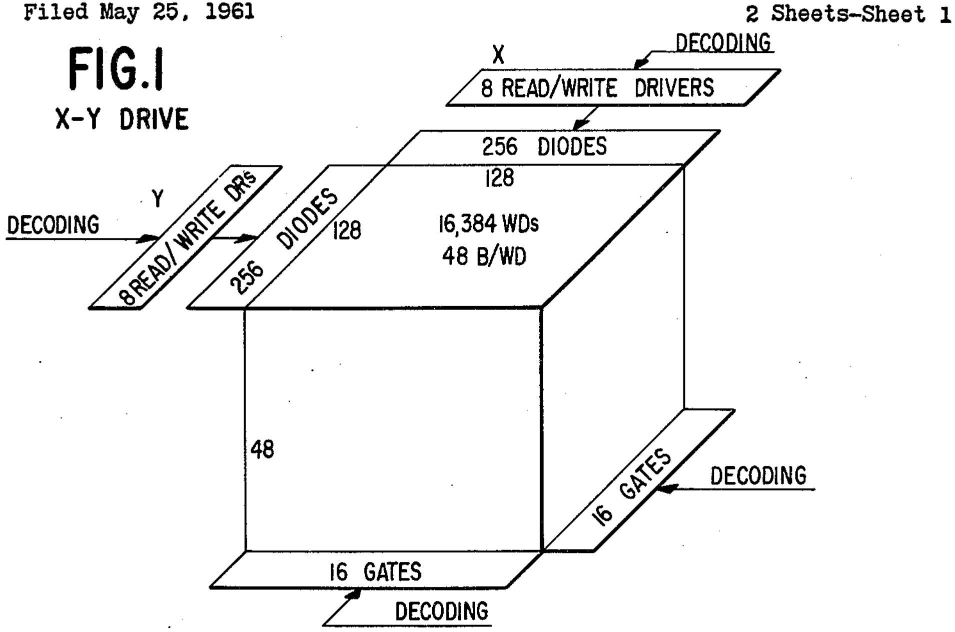
FIGURE 1 is a diagrammatic representation of a 3–D matrix with drive system constructed in accordance with this invention.

Referring first to FIGURE 1, there is shown, diagrammatically, a three-dimensioned core matrix. This matrix is comprised of a plurality of parallel planes of cores, each plane being composed of rows and columns of cores. The number of cores, planes, diodes, gates and read/write drivers depends on the dimensions of the matrix but for illustration purposes one specific example is illustrated here in FIGURE 1. In this example, there are 48 planes, each plane consisting of a rectangular core array having 128 rows and 128 columns of cores. 16,384 words, each word having 48 bits, may be stored in such a three-dimensional matrix. Only the X and Y coordinate drive systems are shown in this figure. Conventional Z coordinate circuitry may be employed. For an example of this, reference is made to the patent to R. G. Counihan et al., 2,740,949, issued April 3, 1956. In the instant case, in the event of a three-dimensional core matrix having the dimensions previously referred to, the X and Y coordinate drive systems each include 8 read and 8 write drivers operating in conjunction with 256 diodes and 16 gates. How these drivers, diodes and gates function in accordance with the present invention will be better illustrated by FIGURE 2.

Figure 2:
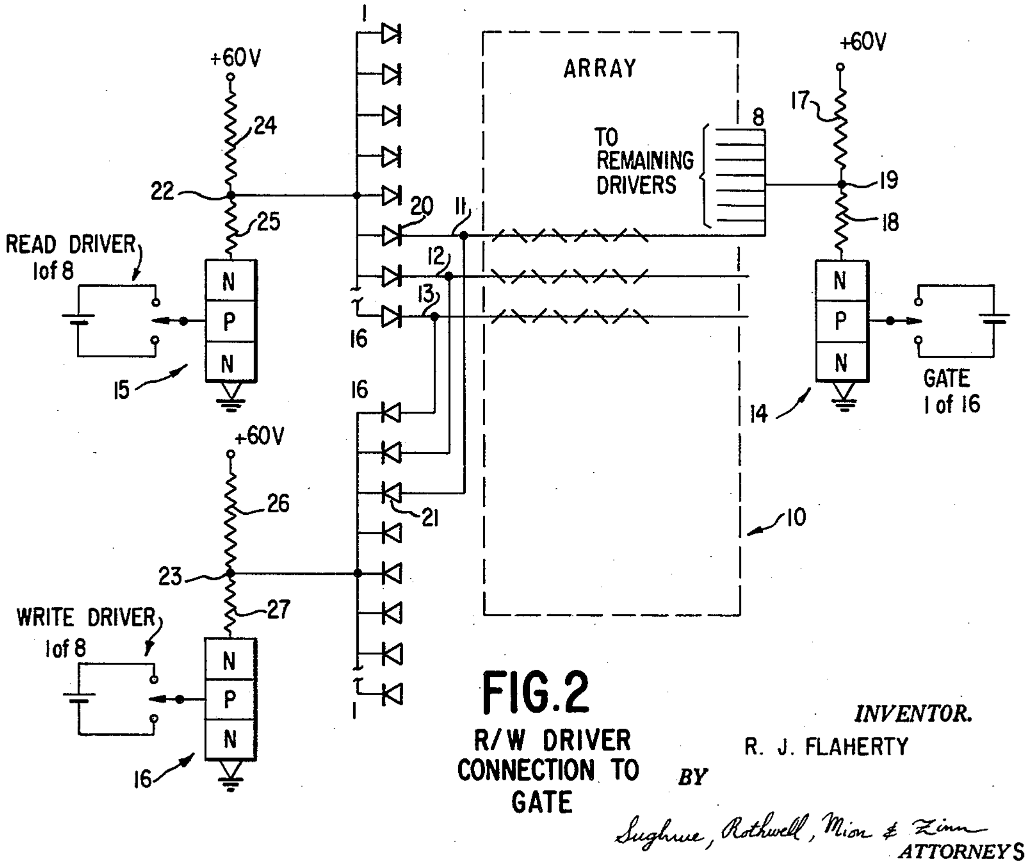
FIGURE 2 is a circuit diagram of a part of the drive system for one coordinate constructed in accordance with this invention.

Referring to FIGURE 2, there is shown what might be considered essentially a two-dimensional core matrix. However, the present invention is equally applicable to a three-dimensional matrix as will be apparent from a detailed description of the functioning of the circuit of FIGURE 2. Let it be assumed that the single plane illustrated in this figure is composed of an array 10 consisting of 128 rows and 128 columns of cores. The drive system shown in FIGURE 2 is only one coordinate of the necessary drive system and provides one-half select current during the write cycle and one-half reset current during the read cycle. These currents, in conjunction with the other coordinate will perform the functions of reading and writing out of or into the two-state cores as desired. Let it be assumed here, that the X coordinate is illustrated, bearing in mind that the Y coordinate may be identically constructed.

As previously stated, there are 128 rows of cores in the array 10. Each row is associated with one drive line such as illustrated at 11, 12 and 13. Each of these drive lines is appropriately wound on each of the cores in its associated row in a conventional fashion. Current flow in one direction provides one-half select current and in the opposite direction one-half reset current. In this particular case, current flowing from left to right as shown here will be read current and from right to left will be write current. On the right-hand side of the array 10 is shown gate 1 of 16 provided for this array. It is essentially comprised of an NPN transistor 14 with grounded emitter and a collector connected through the voltage divider including resistors 17 and 18 to a voltage supply indicated here as +60 volts. Diagrammatic means including a battery and a switch is shown for the purpose of illustrating how this transistor 14 is turned ON and OFF. The connection between resistors 17 and 18 defines a terminal point 19. To this terminal point 19 is connected 8 of the drive lines for the array 10 including drive line 11. Accordingly, it can be said that there are 16 gates, each of which is associated with 8 of the drive lines of the array 10. The gate effectively functions as an ON-OFF switch. It can be seen that when the base of transistor 14 is connected to the negative terminal of the battery associated with the gate that this transistor is turned OFF and the switch is effectively opened.

On the left-hand side of the array 10 there are shown two drivers, one a read driver and one a write driver. Each is one of 8 such drivers associated with the array 10. Read driver 1 of 8 is similar to the gate previously described and includes an NPN transistor 15 with a grounded emitter. It also includes the voltage divider comprising the resistors 24 and 25, the common connecting point thereof defining a terminal point 22. This voltage divider connects the collector of transistor 15 to a voltage supply indicated here as +60 volts. The same system as previously described with relation to the gates is used for turning this transistor ON and OFF and therefore effectively opening or closing the switch which is represented by this read driver. The construction of the write driver is essentially the same as that of the read driver. Here write driver 1 of 8 includes the NPN transistor 16 with grounded emitter. It also includes the voltage dividers 26 and 27, connected between the collector of transistor 16 and the +60 voltage supply. The common connecting point between resistors 26 and 27 defines the terminal point 23. The same ON-OFF action is obtained in connection with this write driver by connecting the base of transistor 16 to either the positive terminal of its associated battery or its negative terminal.

Associated with read driver 1 are 16 diodes including the diode 20. The plates of all of these diodes are commonly connected to terminal point 22. The cathodes of these diodes are individually connected to separate drive lines of the array 10. Illustrated here is the connection between the cathode of diode 20 and drive line 11. For illustration purposes the drive lines 12 and 13 are also connected to the plates of associated diodes in this 16 diode group associated with read driver 1. These diodes, associated with read driver 1, are poled in the direction in which the current flows from right to left in the associated drive lines. In this particular case, diode 21 is associated with drive line 11. Connections are shown between diodes associated with write driver 1 and the drive lines 12 and 13. Current will flow when these diodes are forward biased from right to left in the drive lines associated therewith. It can be seen then that each of the 128 horizontal drive lines is associated with one read driver and one write driver. In turn, each read driver is associated with 16 horizontal drive lines and each corresponding write driver is associated with the same 16 drive lines.

Three individual conditions of the read drivers, write drivers and gates will now be explained. These conditions may be identified as the normal cycle, write cycle and read cycle. The write and read cycles are abvious as to their function. The normal cycle will be identified as that cycle during which neither reading or writing is taking place.

With first reference to the normal cycle, the following conditions prevail: all of the read drivers 1 through 8 are ON and consequently the terminal points 22 associated therewith are at a relatively low potential which will be identified as —V. All of the write drivers 1 through 8 and all of the gates 1 through 16 are OFF and consequently the terminal points 23 and 19 associated therewith will be at a relatively high potential identified herein as +V. Under these circumstances, it can be seen that the diodes associated with the read drivers are reverse biased due to the fact that their plates are at —V whereas their cathode are at +V. All of the diodes associated with the write drivers are passing substantially no current therethrough due to the fact that both the plates and cathodes thereof are at +V. Consequently, during the normal cycle very little, if any, current is flowing in the drive lines.

Now as to the read cycle. Let it be assumed that read driver 1 and gate 1 are to be selected. The selected gate, namely gate 1, is turned ON while all of the other gates, namely gates 2 to 16 inclusive, remain OFF. Terminal point 19 then drops to —V. All of the other terminal points associated with the remaining gates remain at +V. The diodes associated with write driver 1 are reverse biased since the plates thereof are at —V and the cathodes thereof are at +V. The diodes associated with read driver 1 have the same voltage on their plates and cathodes, namely —V. Since resistor 25 is smaller than resistors 18 and 27, diode 20 is back biased and permits no current flow therethrough in drive line 11. All read driver collector resistors are smaller than corresponding resistors associated with the write drivers and gates. The cores in drive line 11 remain unaffected. Now read driver 1 is turned OFF. Its terminal point 22 rises to a +V. Diode 20 is thereby forward biased because its plate is at approximately +V and its cathode is at —V. Read current then flows from the +60 volts supply through resistor 24, diode 20, drive line 11 with its associated cores, resistor 18 and transistor 14 to ground. The read driver 1 is turned ON after the desired pulse time of the read cycle.

Now as to the write cycle, gate 1 is turned OFF and all of the nonselected gates are turned ON. Terminal point 19 goes to +V. Read driver 1 is ON and consequently terminal point 22 and therefore the plates of the associated diodes are at —V. Diode 20 is reverse biased. Write drive 1 is turned OFF and consequently terminal point 23 and the cathode of the associated diodes are at +V. These diodes have essentially the same voltage thereacross and consequently little or no current is flowing therethrough. Now, write driver 1 is turned ON causing its terminal point 23 to go to —V. This forward biases the diodes associated with the write driver and particularly in this case diode 21. White current therefore flows from the +60 volts supply through resistor 17, drive line 11 with its associated cores, diode 21, resistor 27, the transistor 16 to ground.

Figure 3:
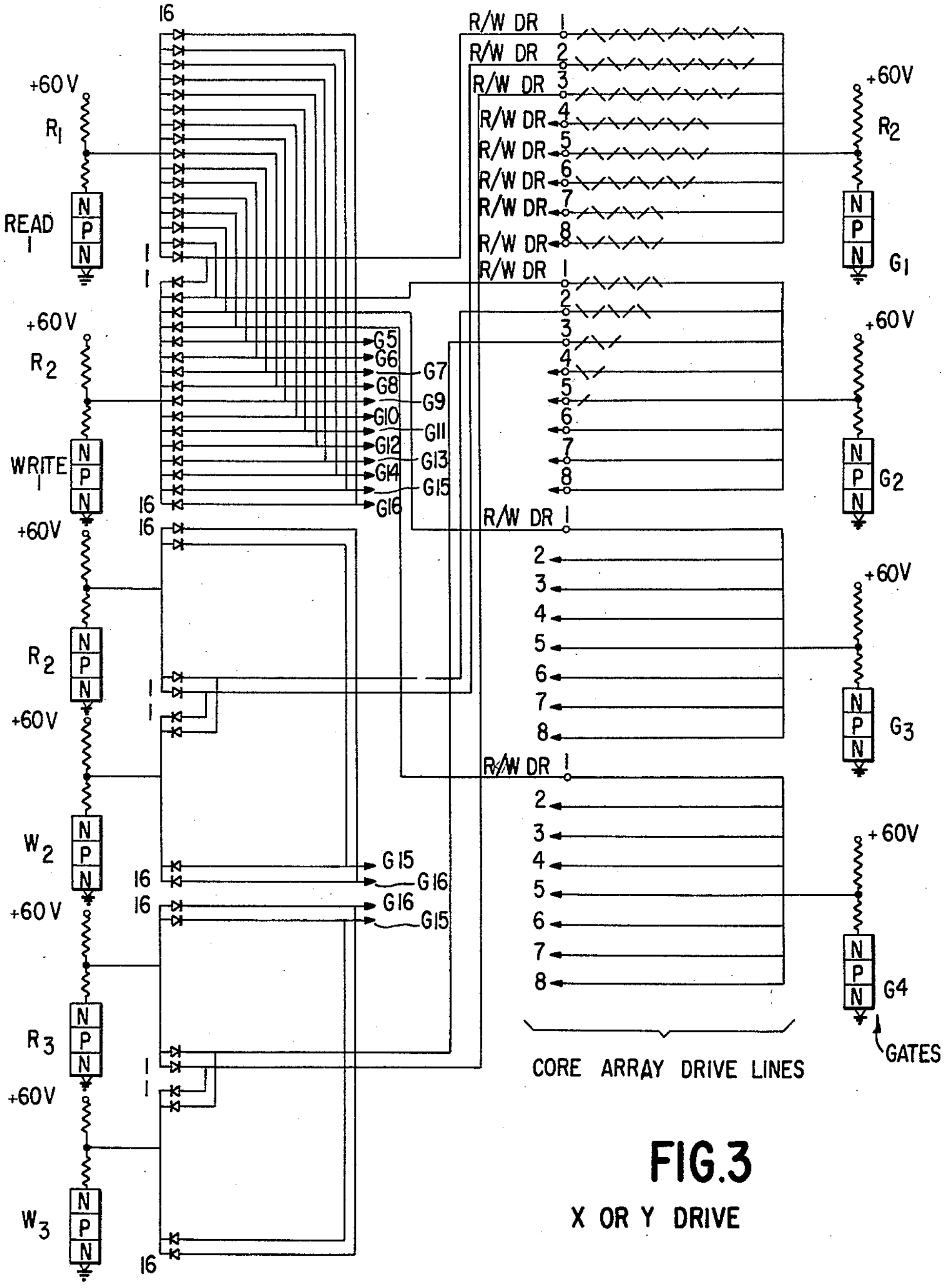
FIGURE 3 is a more complete circuit diagram of the drive system of FIGURE 2.

Referring now to FIGURE 3, there is shown a more complete representation of either the X or Y drive coordinates. It can be seen here that one of the gates is associated with 8 drive lines in this particular arrangement and one read and one write driver is associated with 16 drive lines. It should be noted in this connection that the drive system employs only one conductivity type transistor. In this particular case, it is an NPN type. It should also be noted that the diodes do not require very large back voltages because the reference drive voltage is changed between the write and read cycles. A large breakdown transistor is not necessary in accordance with the present invention. Additionally, no matrix switch is required to produce bi-polar pulses for the read and write operations.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A bi-polar read and write current drive system for a magnetic core storage array including a plurality of two-condition cores arranged in rows and columns threaded by coordinate row and column drive lines and wherein the drive lines are divided into a plurality of groups comprising:

(a) a source of positive voltage potential, (b) a plurality of transistor gate means having on and off positions, (c) a plurality a first voltage dividing impedance networks having first center terminals therein, each network being connected between the source of positive voltage potential and one of the gate means, and each first center terminal being connected to one end of all of the drive lines in a particular group, each first center terminal being at a first potential when its associated gate is off and at a second potential when its associated gate is on, (d) a plurality of transistor read driver means having on and off positions, (e) a plurality of second voltage dividing impedance networks having second center terminals therein, each network being connected between the source of positive voltage potential and one of the read driver means, and each second center terminal being at a first potential when its associated read driver is off and at a second potential when its associated read driver is on, (f) a plurality of first diodes poled in a first direction, each diode being connected between the other end of one of the drive lines and one of the second center terminals in such a manner that each second center terminal is associated with a corresponding drive line from each group, (g) a plurality of transistor write driver means having on and off positions, (h) a plurality of third voltage dividing impedance networks having third center terminals therein, each network being connected between the source of positive voltage potential and one of the write driver means, and each third center terminal being at a first potential when its associated write driver is off and at a second potential when its associated wire driver is on, and (i) a plurality of second diodes poled in a second direction, each diode being connected between the other end of one of the drive lines and one of the third center terminals in such a manner that each third center terminal is associated with a corresponding drive line from each group, whereby when the gate means of a particular group is on and the read and write drivers of a selected drive line in that group are off current will flow through the selected drive line in a first direction, and when the gate means of a particular group is off and the read and write drivers of a selected drive line in that group are on current will flow through the selected drive line in a second direction.

2. A bi-polar read and write current drive system for a magnetic core storage array as defined in claim 1 wherein each of the first, second, and third voltage dividing impedance networks comprises first and second series connected resistors, the first resistor being connected between the source of positive voltage potential and the center terminal and the second resistor being connected between the center terminal and its associated transistor.

3. A bi-polar read and write current drive system for a magnetic core storage array as defined in claim 2 wherein the second resistor of each second voltage dividing impedance network has a smaller value than the second resistors of each first and third voltage dividing impedance network.

4. A bi-polar read and write current drive system for a magnetic core storage array as defined in claim 3 wherein there are the same number of gate means as the total of the read and write driver means.

5. A bi-polar read and write current drive system for a magnetic core storage array as defined in claim 4 wherein the transistors associated with the gate, read driver, and write driver means are all of the same conductivity type.

References Cited by the Examiner

UNITED STATES PATENTS

| | | | |
|---|---|---|---|
| 2,993,198 | 7/61 | Barnes et al. | 340—166 |
| 2,997,700 | 8/61 | Kramer | 340—174 |
| 3,027,546 | 3/62 | Howes et al. | 340—174 |

IRVING L. SRAGOW, *Primary Examiner.*

JOHN T. BURNS, *Examiner.*